United States Patent
Gokhale et al.

(10) Patent No.: US 7,831,766 B2
(45) Date of Patent: Nov. 9, 2010

(54) SYSTEMS AND METHODS OF DATA STORAGE MANAGEMENT, SUCH AS PRE-ALLOCATION OF STORAGE SPACE

(75) Inventors: Parag Gokhale, Ocean, NJ (US); Michael F. Klose, Goch (DE)

(73) Assignee: Comm Vault Systems, Inc., Oceanport, NJ (US)

( * ) Notice: Subject to any disclaimer, the term of this patent is extended or adjusted under 35 U.S.C. 154(b) by 366 days.

(21) Appl. No.: 11/963,555

(22) Filed: Dec. 21, 2007

(65) Prior Publication Data

US 2008/0288738 A1 Nov. 20, 2008

Related U.S. Application Data

(60) Provisional application No. 61/007,524, filed on Dec. 22, 2006.

(51) Int. Cl.
*G06F 12/00* (2006.01)
(52) U.S. Cl. ...................................................... 711/112
(58) Field of Classification Search ........................ None
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi et al. | |
| 5,491,810 A | 2/1996 | Allen | |

(Continued)

FOREIGN PATENT DOCUMENTS

EP 0259912 3/1988

(Continued)

OTHER PUBLICATIONS

Non-Final Office Action for U.S. Appl. No. 11/269,520, Mail Date Dec. 10, 2008, 22 pages.

(Continued)

*Primary Examiner*—Hiep T Nguyen
(74) *Attorney, Agent, or Firm*—Perkins Coie LLP (57) ABSTRACT

A system and method for pre-allocating space on a storage medium is described. In some cases, the system receives two or more data items to be stored on a storage medium, pre-allocates a single, contiguous block of space on the medium, and stores the two or more data items within the single, contiguous block of space.

16 Claims, 9 Drawing Sheets

U.S. PATENT DOCUMENTS

| | | | |
|---|---|---|---|
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,559,957 | A | 9/1996 | Balk |
| 5,619,644 | A | 4/1997 | Crockett et al. |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,901,327 | A | 5/1999 | Ofek |
| 5,924,102 | A | 7/1999 | Perks |
| 5,938,734 | A | 8/1999 | Yao et al. |
| 5,950,205 | A | 9/1999 | Aviani, Jr. |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem et al. |
| 6,088,745 | A * | 7/2000 | Bertagna et al. ............... 710/56 |
| 6,094,416 | A | 7/2000 | Ying |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton et al. |
| 6,330,642 | B1 | 12/2001 | Carteau |
| 6,343,324 | B1 | 1/2002 | Hubis et al. |
| 6,349,312 | B1 * | 2/2002 | Fresko et al. .................... 1/1 |
| RE37,601 | E | 3/2002 | Eastridge et al. |
| 6,356,801 | B1 | 3/2002 | Goodman et al. |
| 6,374,336 | B1 | 4/2002 | Peters et al. |
| 6,389,432 | B1 | 5/2002 | Pothapragada et al. |
| 6,421,711 | B1 | 7/2002 | Blumenau et al. |
| 6,487,561 | B1 | 11/2002 | Ofek et al. |
| 6,505,216 | B1 | 1/2003 | Schutzman et al. |
| 6,519,679 | B2 | 2/2003 | Devireddy et al. |
| 6,538,669 | B1 | 3/2003 | Lagueux, Jr. et al. |
| 6,542,972 | B2 | 4/2003 | Ignatius et al. |
| 6,564,228 | B1 | 5/2003 | O'Connor |
| 6,658,526 | B2 | 12/2003 | Nguyen et al. |
| 6,691,136 | B2 * | 2/2004 | Lee et al. ............................ 1/1 |
| 2005/0132257 | A1 | 6/2005 | Gold et al. |
| 2007/0022148 | A1 * | 1/2007 | Akers et al. ................. 707/205 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 11/269,520, Gokhale et al.
U.S. Appl. No. 11/963,581, Gokhale.
U.S. Appl. No. 12/060,151, Attarde.

* cited by examiner

SYSTEMS AND METHODS OF DATA STORAGE MANAGEMENT, SUCH AS PRE-ALLOCATION OF STORAGE SPACE

CROSS-REFERENCE TO RELATED APPLICATION(S)

This application claims priority to U.S. Provisional Patent Application No. 61/007,524, filed on Dec. 22, 2006, entitled SYSTEMS AND METHODS OF DATA STORAGE MANAGEMENT, SUCH AS DYNAMIC DATA STREAM ALLOCATION, which is incorporated by reference in its entirety.

This application is related to the following pending U.S. application, which is hereby incorporated herein by reference in its entirety:

U.S. patent application Ser. No. 10/990,357 filed on Nov. 15, 2004, entitled SYSTEM AND METHOD FOR COMBINING DATA STREAMS IN PIPELINED STORAGE OPERATIONS ON A STORAGE NETWORK.

BACKGROUND

Systems used to perform data storage operations of electronic data are growing in complexity. However, current systems may not be able to accommodate increased data storage demands or efficient and timely restore operations.

Often, these systems are required to store large amounts of data (e.g. all of a company's data files) during a time period known as a "storage window." The storage window defines a duration and actual time period when the system may perform storage operations. For example, a storage window may be for twelve hours, between 6 PM and 6 μM (that is, twelve non-business hours).

Often, storage windows are rigid and unable to be modified. Therefore, when data storage systems attempt to store increasing data loads, they may need to do so without increasing the time in which they operate. Additionally, many systems perform daily stores, which may add further reliance on completing storage operations during allotted storage windows.

Additionally, or alternatively, current systems may attempt to store a large number of distinct jobs, or groups of data, chunks of data, and so on. The system may look at each job as a separate storage operation, which often leads to fragmentation on secondary storage devices (tapes, magnetic disks, and so on) that receive data stores as the storage devices develop small gaps of unused space between spaces containing data. In these cases, the system may inefficiently restore stored data because of the fragmentation that occurs during the data storage process.

The foregoing examples of some existing limitations are intended to be illustrative and not exclusive. Other limitations will become apparent to those of skill in the art upon a reading of the Detailed Description below. These and other problems exist with respect to data storage management systems.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1120 is first introduced and discussed with respect to FIG. 11).

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

DETAILED DESCRIPTION

Examples of the technology are directed to systems and methods that dynamically improve, modify, and/or correct data flows and processes during data storage operations.

In some examples, the system pre-allocates disk space before transferring data to a secondary storage device (or, in some cases, a primary storage device). The system may pre-allocate disk space in order to reduce disk fragmentation when copying a number of jobs (data files, exchange files, SQL files, and other data) to a secondary storage device. The system may dynamically determine that a secondary storage device contains a certain amount of free disk space, and pre-allocate the disk space based on such information. Additionally, or alternatively, the system may refer to storage operation statistics (such as historical statistics, failure statistics, jobs statistics, and so on), the data being transferred during the storage operation, and/or the characteristics or available on the disk when pre-allocating disk space.

Various examples of the system will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Figure 1A:
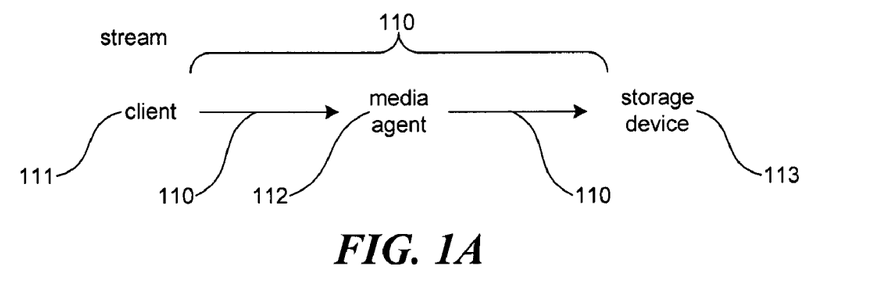
FIG. 1A is a block diagram illustrating an example of components used in data storage operations.

Referring to FIG. 1A, a block diagram illustrating components of a data stream is shown. The stream 110 may include a client 111, a media agent 112, and a secondary storage device 113. For example, in storage operations, the system may store, receive and/or prepare data to be stored, copied or backed up at a server or client 111. The system may then transfer the data to be stored to media agent 112, which may then refer to storage policies, schedule policies, and/retention policies (and other policies), and then choose a secondary storage device 113 for storage of the data. Secondary storage devices may be magnetic tapes, optical disks, USB and other similar media, disk and tape drives, and so on.

Figure 1B:
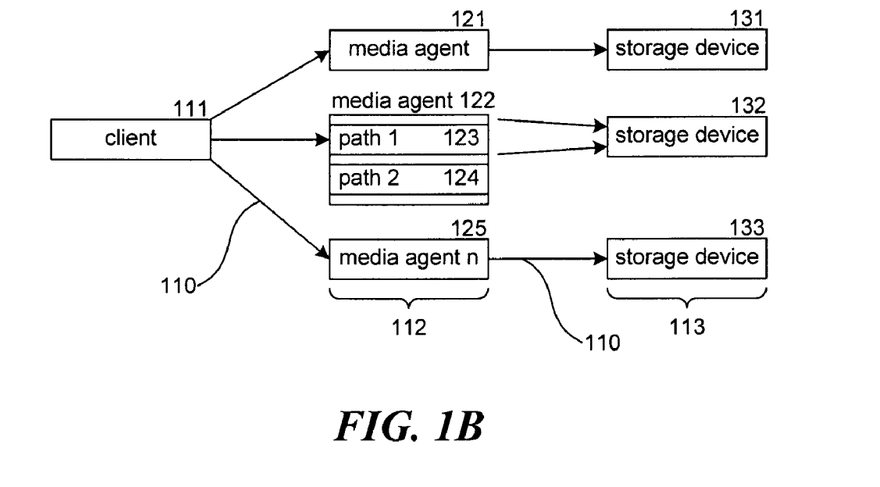
FIG. 1B is a block diagram illustrating an alternative example of components used in data storage operations.

Referring to FIG. 1B, a block diagram illustrating components of multiple selectable data streams is shown. Client 111 and any one of multiple media agents 112 may form a stream 110. For example, one stream may contain client 111, media agent 121, and storage device 131, while a second stream may use media agent 125, storage device 133, and the same client 111. Additionally, media agents may contain additional subpaths 123, 124 that may increase the number of possible streams for client 111. Examples of subpaths 123, 124 include host bus adapter (HBA) cards, Fibre Channel cards, SCSI cards, and so on. Thus, the system is able to stream data from client 111 to multiple secondary storage devices 113 via multiple media agents 112 using multiple streams.

Figure 1C:
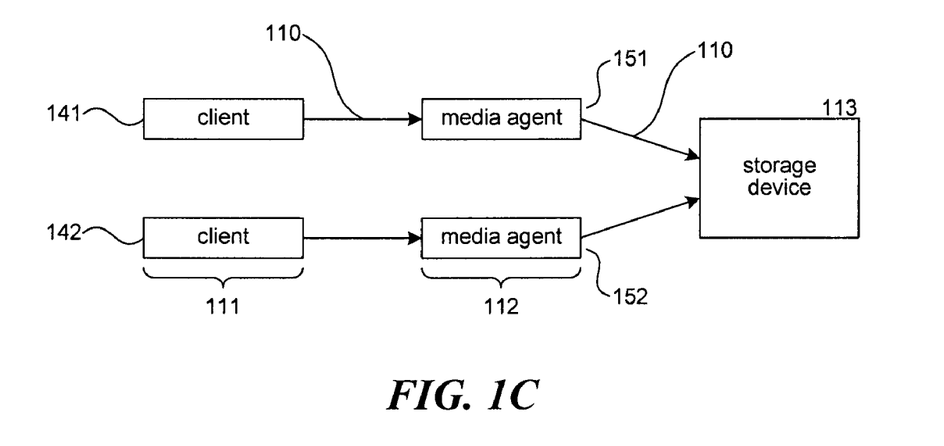
FIG. 1C is a block diagram illustrating an alternative example of components used in data storage operations.

Referring to FIG. 1C, a block diagram illustrating components of alternative multiple selectable data streams is shown. In this example, the system may transfer data from multiple media agents 151, 152 to the same storage device 113. For example, one stream may be from client 141, to media agent 151, to secondary storage device 113, and a second stream may be from client 142, to media agent 152, to secondary storage device 113. Thus, the system is able to copy data to one secondary storage device 113 using multiple streams 110.

Additionally, the system may stream may be from one client to two media agents and to one storage device. Of course, the system may employ other configurations of stream components not shown in the Figures.

Figure 2:
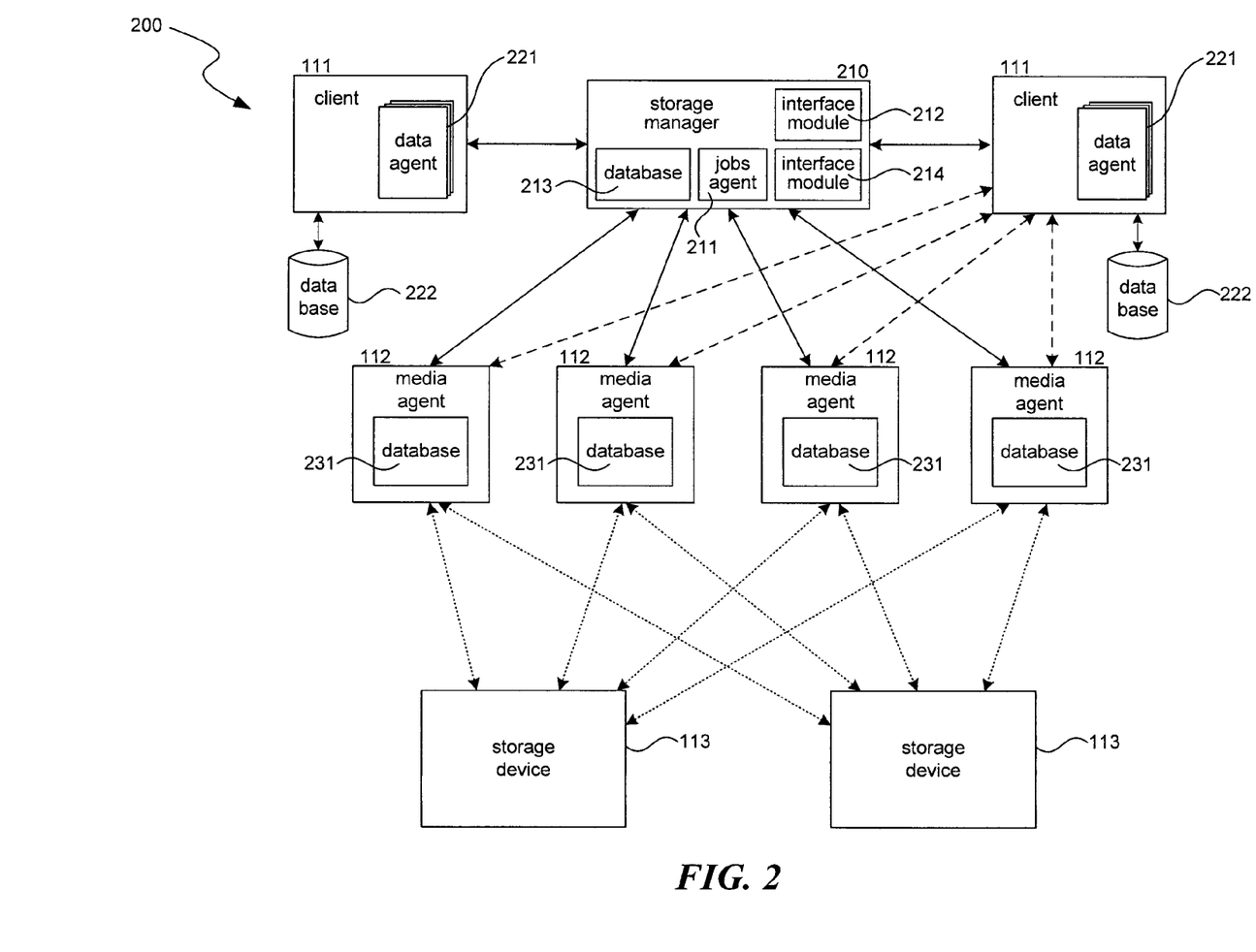
FIG. 2 is a block diagram illustrating an example of a data storage system.

Referring to FIG. 2, a block diagram illustrating an example of a data storage system 200 is shown. Data storage systems may contain some or all of the following components, depending on the needs of the system.

For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that assist and implement the storage of data into secondary storage devices, for example.

The data storage system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. The data copies may include snapshot copies, backup copies, HSM copies, archive copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store or copy data from a source to a data store, such as storage media. Storage policies may be stored in storage manager 210, or may be stored in other resources, such as a global manager, a media agent, and so on. Further details regarding storage management and resources for storage management will now be discussed.

Figure 3:
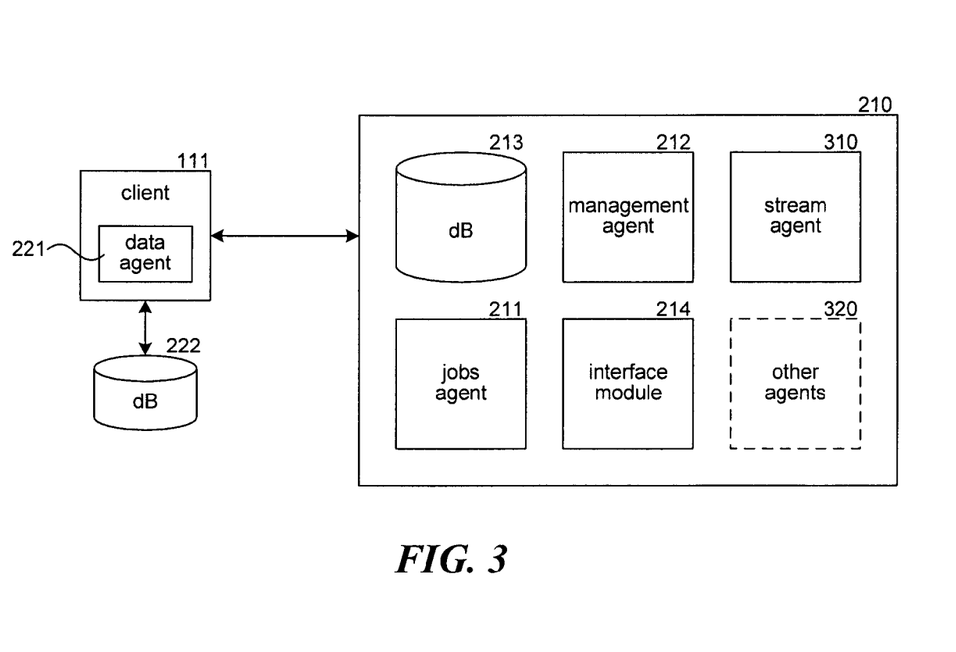
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to primary or secondary storage. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

Pre-Allocation of Disk Space

In some cases, the system pre-allocates disk space on a secondary storage device before writing data to the secondary storage device. Pre-allocation may reduce disk fragmentation when many discrete jobs are transferred to the secondary storage device.

Figure 4:
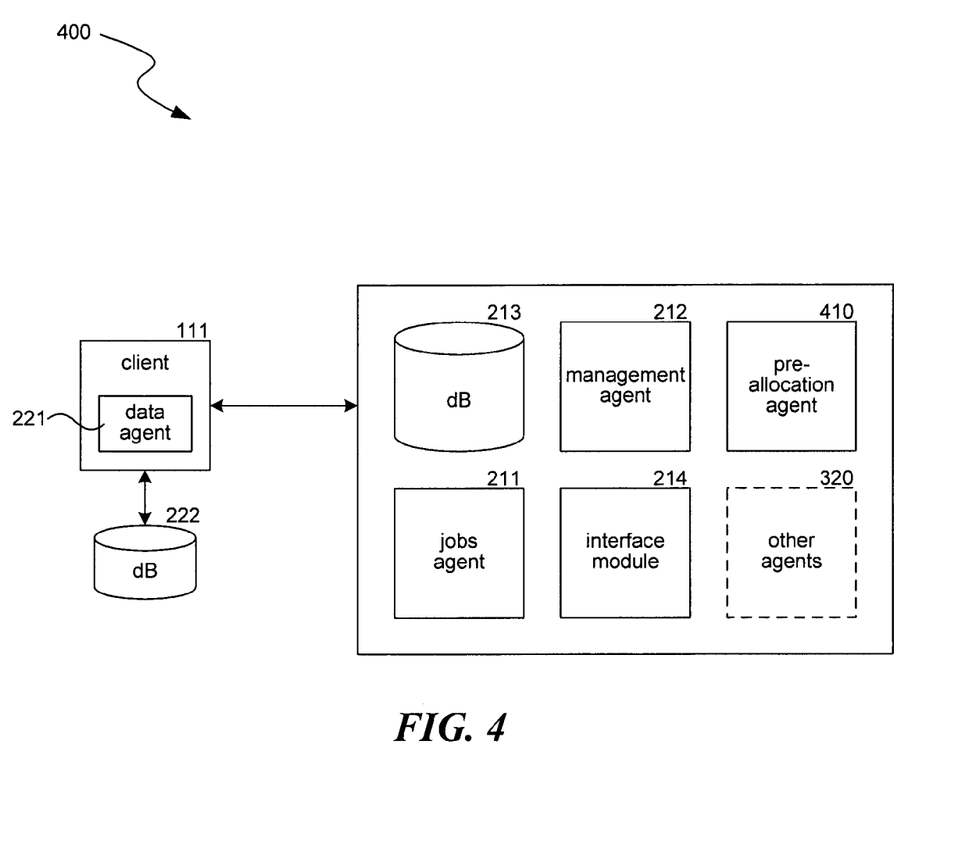
FIG. 4 is a block diagram illustrating an example of a routine for components of a server used in disk allocation.

Referring to FIG. 4, a block diagram illustrating an example of components of a server used in disk allocation is shown. A server, such as storage manager 210, may communicate with clients 111 to determine data to be copied to primary or secondary storage. As described above, the storage manager 210 may contain a jobs agent 211, a management agent 212, a database 213, and/or an interface module. Jobs agent 211 may manage and control the transfer of jobs (such as data files) from clients 111 to media agents 112. Management agent 212 may control the overall processes of the data storage system, or may communicate with global managers. Database 213 may store storage policies, schedule policies, retention policies, or other information, such as historical storage statistics, storage trend statistics, and so on. Interface module 215 may interact with a user interface, enabling the system to present information to administrators and receive feedback or other input from the administrators.

The storage manager 210 may also contain a pre-allocation agent 910 that communicates with the other agents and the system to pre-allocate disk space on secondary storage devices data streams during data storage operations. For example, stream agent 410 may contact the management agent 212 to determine where to send jobs, and instruct the jobs agent 211 to send pending or future storage jobs to pre-allocated blocks or space or memory or storage on selected secondary storage devices. Further details with respect to the pre-allocation agent 410 will be discussed below. The storage manager may also contain and use other agents used in dynamic management of the data storage system, such as stream agents, as discussed herein.

Figure 5:
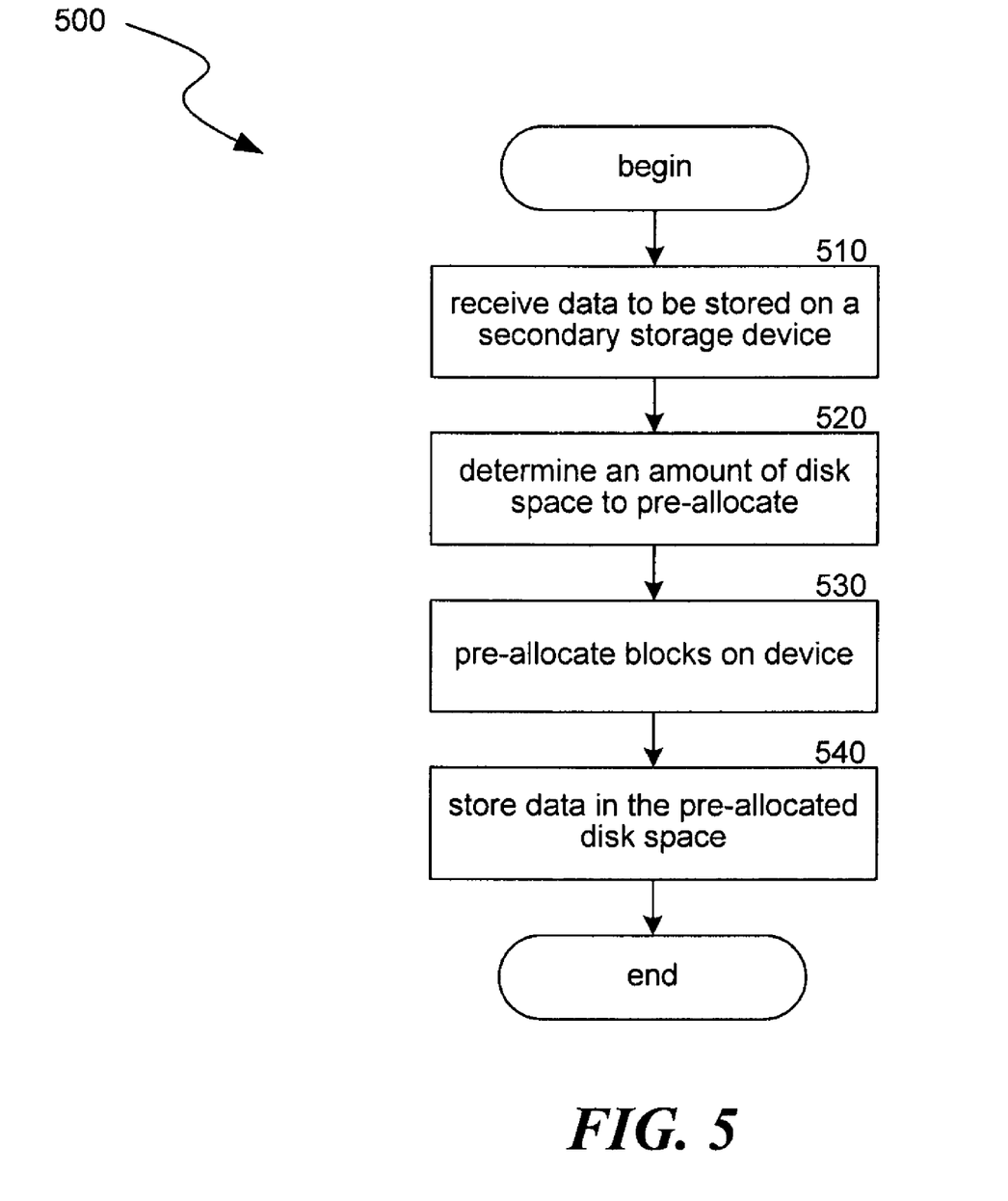
FIG. 5 is a flow diagram illustrating an example of a routine for pre-allocating a secondary storage device.

Referring to FIG. 5, a flow diagram illustrating a routine 500 as an example of pre-allocating a secondary storage device is shown. In step 510, the system receives data to be stored on a secondary storage device. In step 520, the system determines an amount of storage space (such as disk space) to pre-allocate for the received data. In some cases, the system reviews the remaining space on the destination storage device, and pre-allocates accordingly. Alternatively, or additionally, the system reviews an estimated size of the pending jobs to be stored, and pre-allocates accordingly. In step 530, the system pre-allocates data blocks on the secondary storage device, as described below. In step 540, the system sends the jobs to be stored to the pre-allocated portion of the secondary storage device, and routine 500 ends.

In these cases, the system acts or pretends to pre-allocate disk space for a singular data transfer job by selecting a predicted range of data blocks for subsequently transferred data, and then transfers many jobs to the pre-allocated space. The system attempts to choose a pre-allocation size that closely matches or is greater than the total size of the jobs to be stored in the pre-allocated portion.

For example, a file system prepares to store a number of jobs (e.g., 50,000 jobs having an average size of 1 MB) to magnetic disk, and looks to available space on the disk. The system identifies 100 MB of space on the magnetic disk. In order to reduce fragmentation of the disk, the system instructs the file system that it is going to store one large job requiring 100,000 MB of disk space. In so instructing this to the file system, the system pre-allocates the 100,000 MB of contiguous space, effectively tricking the file system. The system then copies all 50,000 jobs to the pre-allocated, contiguous space. This avoids any fragmentation, which could have occurred if the file system had looked to fill gaps in the disks with various ones of the 1 MB files. This also helps speed writes and subsequent reads if the disk drive need not frequently seek and move the read head around on the disk. The system may then determine that too much space was pre-allocated, and frees up the extra space in the file system for future storage operations. In effect, the system pretends to write one large file to a large number of blocks on a disk and instead writes many smaller jobs to the large space.

Figure 6:
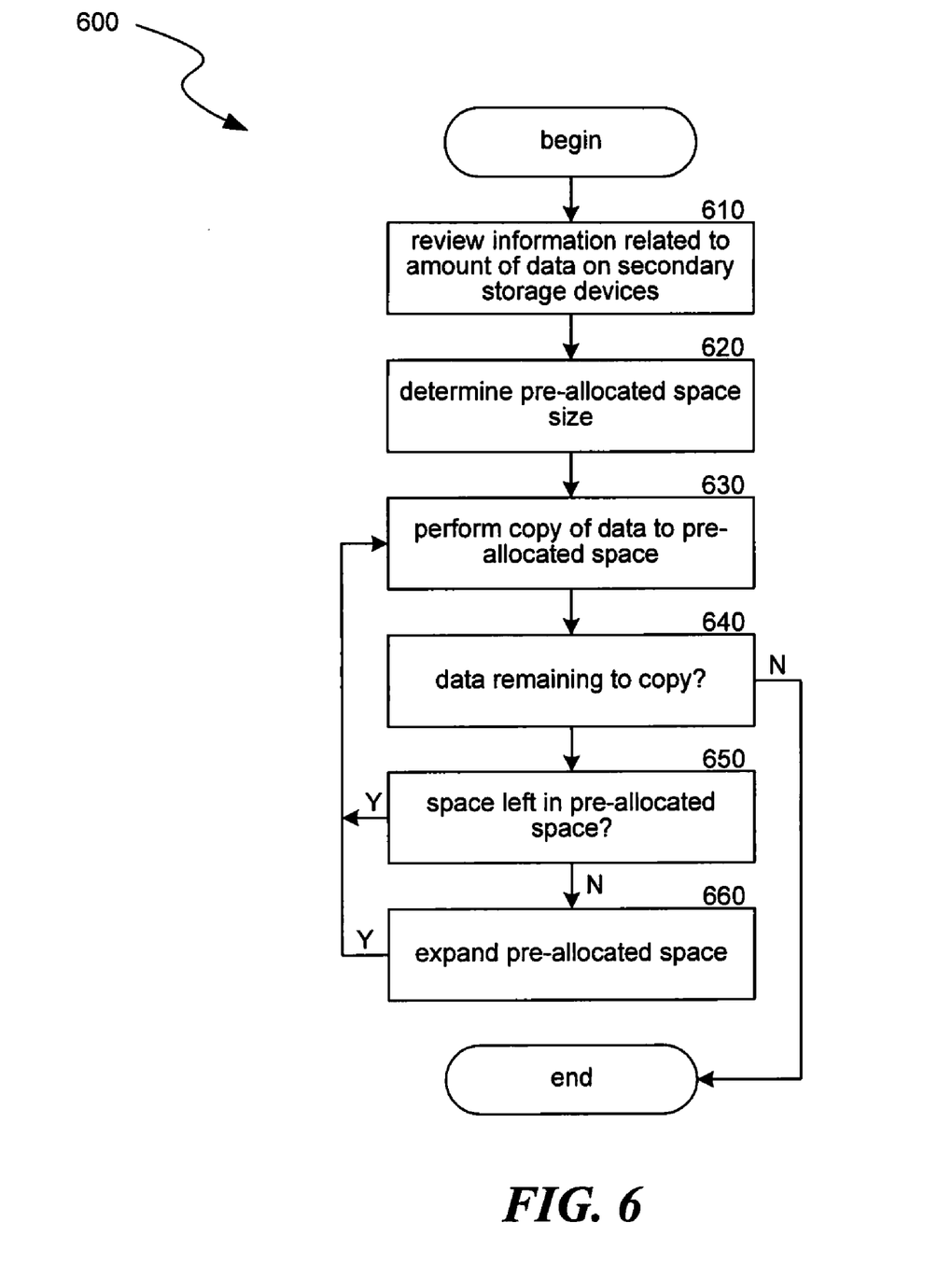
FIG. 6 is a flow diagram illustrating an alternative example of a routine for pre-allocating a secondary storage device.

Referring to FIG. 6, a flow diagram illustrating a routine 600 as an alternative example of pre-allocating a secondary storage device is shown. In step 610, the system reviews information related to the amount of data (or, available space) on a destination secondary storage device, such as a disk drive. In step 620, the system determines a size of pre-allocated blocks based on the reviewed information. In step 630, the system transfers data to the pre-allocated blocks of the destination device. In step 640, the system checks a job queue or other area for pending jobs. If there are pending jobs, the system, in step 650, checks to see if the pre-allocated space contains extra or empty blocks, else routine 600 ends. If there are sufficient empty blocks, routine 600 proceeds to step 630 and transfers the jobs to the destination device. If the pre-allocated space is full, routine 1100 proceeds to step 660. In step 660, the system expands the pre-allocated space by requesting additional space from the file system, and transfers the jobs to the expanded space.

In some cases, the system may pre-allocate disk space larger than necessary for the amount of data transferred to the space, which may result in internal fragmentation. The system may avoid this type of fragmentation by freeing up any extra unused data blocks after transferring all jobs to the pre-allocated space, as noted above. Thus, if the system requested a contiguous 100 MB space from the file system, but used only 50 MB, then the system would instruct the file system that the originally requested file was on 50 MB in size and thus the file system could flag as unused the additional 50 MB.

The system tracks locations of transferred data using a data structure, for example a file allocation table, or FAT, under a file system provided by the operating system. However, a main or primary FAT may only reflect the overall contents of pre-allocated spaces. Therefore, the system may create auxiliary FATs or tables (that is, data structures that show or list the files stored in each of the large pre-allocated spaces) for each pre-allocated location.

Figure 7:
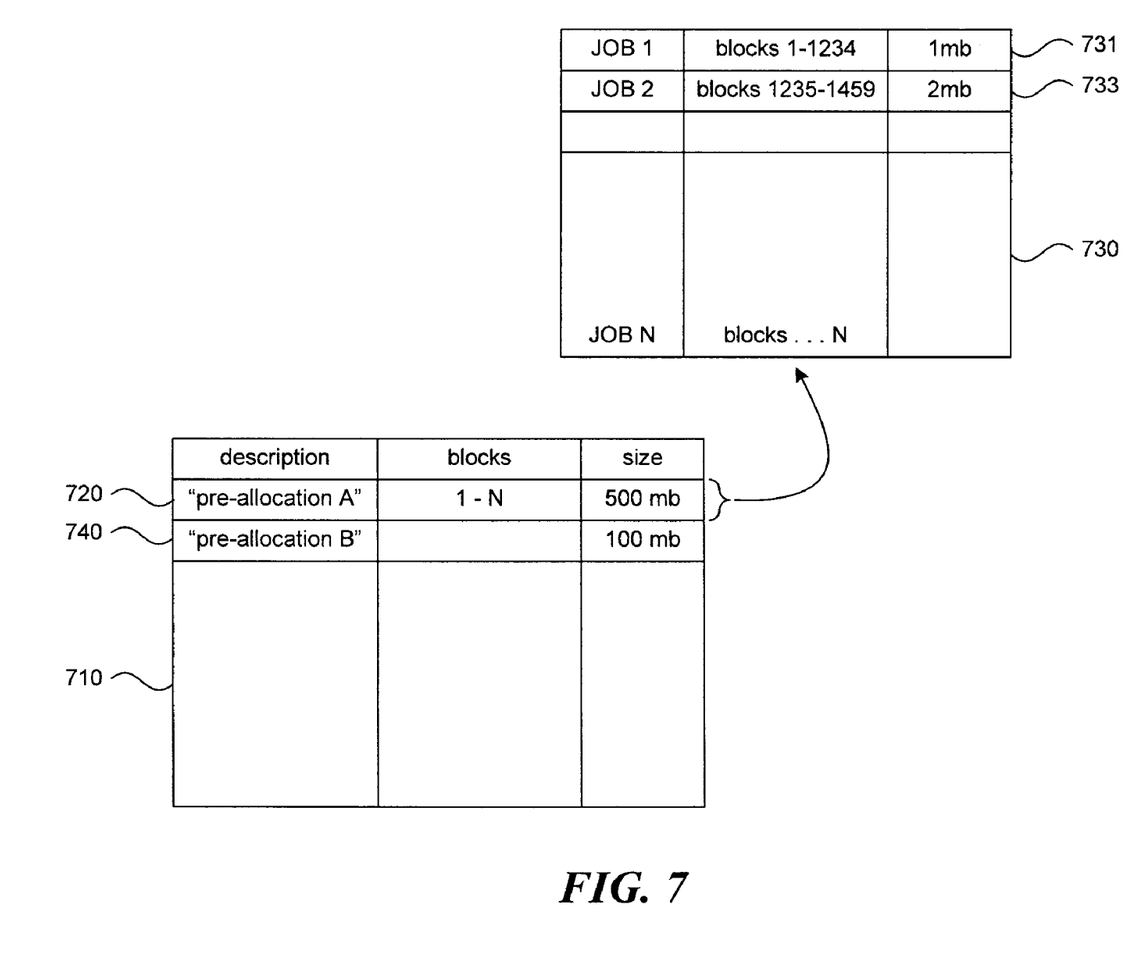
FIG. 7 is a block diagram illustrating example file allocation tables (FATs) used in pre-allocation.

Referring to FIG. 7, a block diagram illustrating an example of a data structure, e.g., a file allocation table (FAT) used in pre-allocation is shown. FAT 710 may contain sections related to a file description or name, the starting blocks of the storage device, the size of the file, and so on. However, the system may also contain one or more auxiliary data structures 730 that help account for each file in the FAT 710, in order to provide location information for each file. For example, entry 720 of FAT 710 relates to a file named "pre-allocationA" and may relate to auxiliary table 730, which contains file allocation data for all the files within the pre-allocated space that was named "pre-allocationA." Auxiliary table 730, therefore, may contain the individual file entries 731 (ob 1) and 733 (ob 2). An additional pre-allocation entry 740 may then relate to an additional auxiliary table (not shown).

For example, the system pre-allocates blocks 1 to n of a secondary storage device in order to transfer certain jobs to the device. The data storage system will make entry 720 for this transfer, as the file system sees the pre-allocation as a transfer of one large job. The file system may name the entry 720 "pre-allocationA," or other identifier and record the range of blocks for the pre-allocated space (block 1 to block n), or the starting block for the space, in the FAT of the file system. The data storage system may also create auxiliary table 730, in a storage manager database, that will contain the internal information of each job transferred to the pre-allocated space. Auxiliary table 730 may then contain entries for each individual job (job 1 to job n). Thus, the system creates a table or auxiliary FAT for individual jobs despite pre-allocating disk space for a transfer of multiple discrete jobs.

Intelligent Storage of Data onto Media

In some examples, the system dynamically and intelligently determines an appropriate location in which to store data based on characteristics of the data items, based on characteristics of a storage medium, and/or based on other factors. For example, the system may examine one or more data items to be stored on a disk-based storage medium, and select a location for the storage based on the examination.

Figure 8:
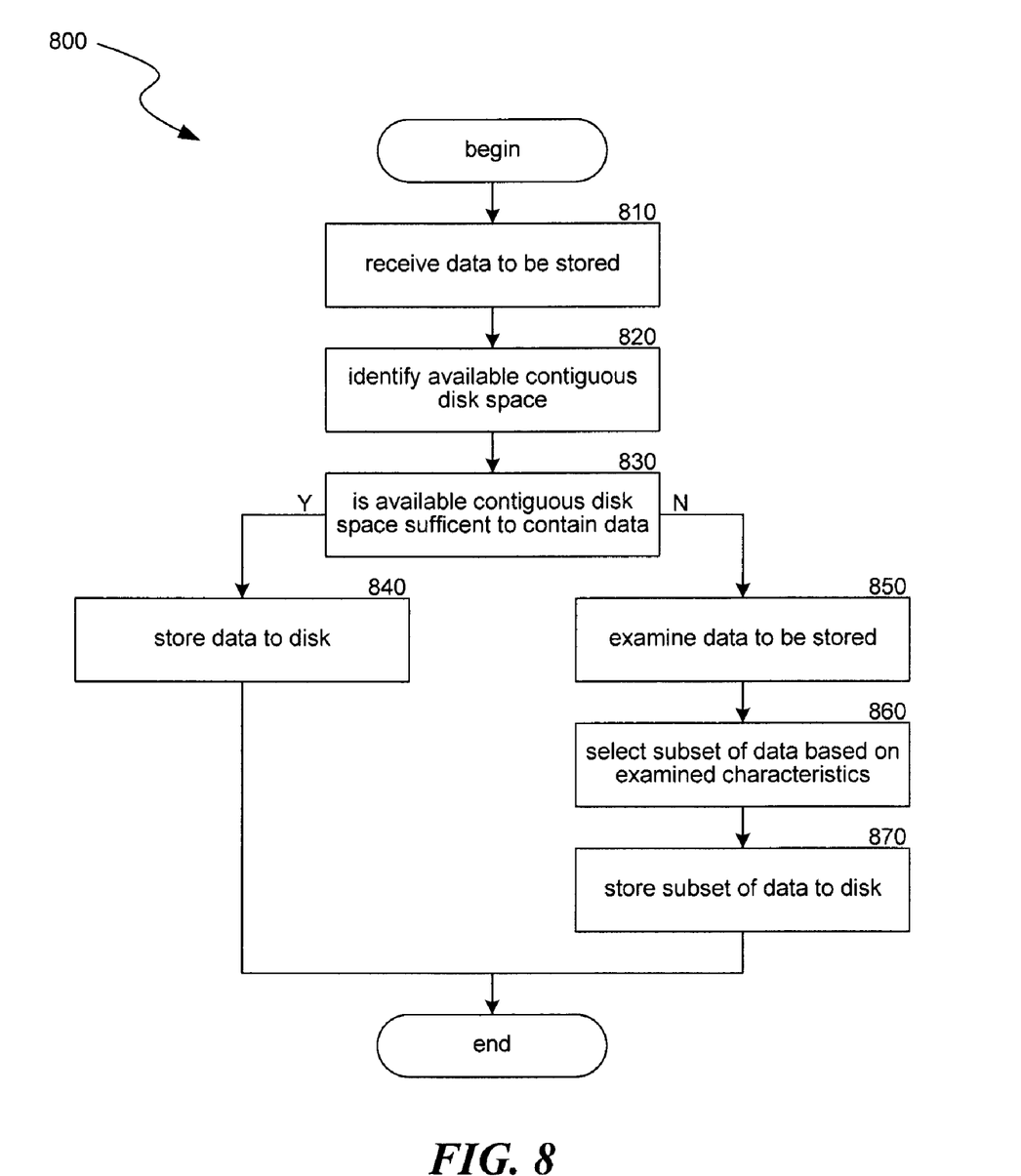
FIG. 8 is a flow diagram illustrating a routine for storing data based on characteristics of the data.

Referring to FIG. 8, a flow diagram illustrating a routine 800 for storing data based on characteristics of the data is shown. In block 810, the system receives data to be stored, such as data to be stored to optical disk storage. In block 820, the system identifies available contiguous space for a target disk. The system may identify one or more different locations that include contiguous disk space. In block 830, the system determines whether the identified contiguous disk space is sufficient to contain the data to be stored. If the identified contiguous disk space is sufficient, the system, in block 840, stores the data to the disk.

If the identified contiguous disk space is not sufficient to contain the data, routine proceeds to block 850. In block 850, the system examines the data to be stored. For example, the system may examine the type of data, the date the data was created or modified, the metadata assigned to the data, and so on. The examined metadata may be information related to an owner or creator of the data, a frequency of access of the data, the content of the data, the security or permissions assigned to the data, tags applied to the data by users, and so on.

In block 860, the system selects a subset of the data based on the examined characteristics. For example, the system may examine a set of data, and determine that one quarter of all the data items are encrypted with the same encryption or security key. The system may then group all the similarly encrypted data and select these items to create a subset of the set of data. In another example, the system may examine the set of data and determine that a third of the data has not been assigned any tags by users. The system may then group the untagged data and select these items to create another subset. The system may select subsets for a variety of reasons, such as to group similarly tagged data, to group data having similar metadata characteristics, to group data created by the same users or during a similar time period, to group data that is not associated other data, and so on.

After selecting the subset of the data, the system, in block 870, stores the selected subset to the available contiguous space on the disk. In some cases, the system may attempt to optimize the storage by storing a subset of data with a location having a similar size, as shown in FIG. 9.

Figure 9:
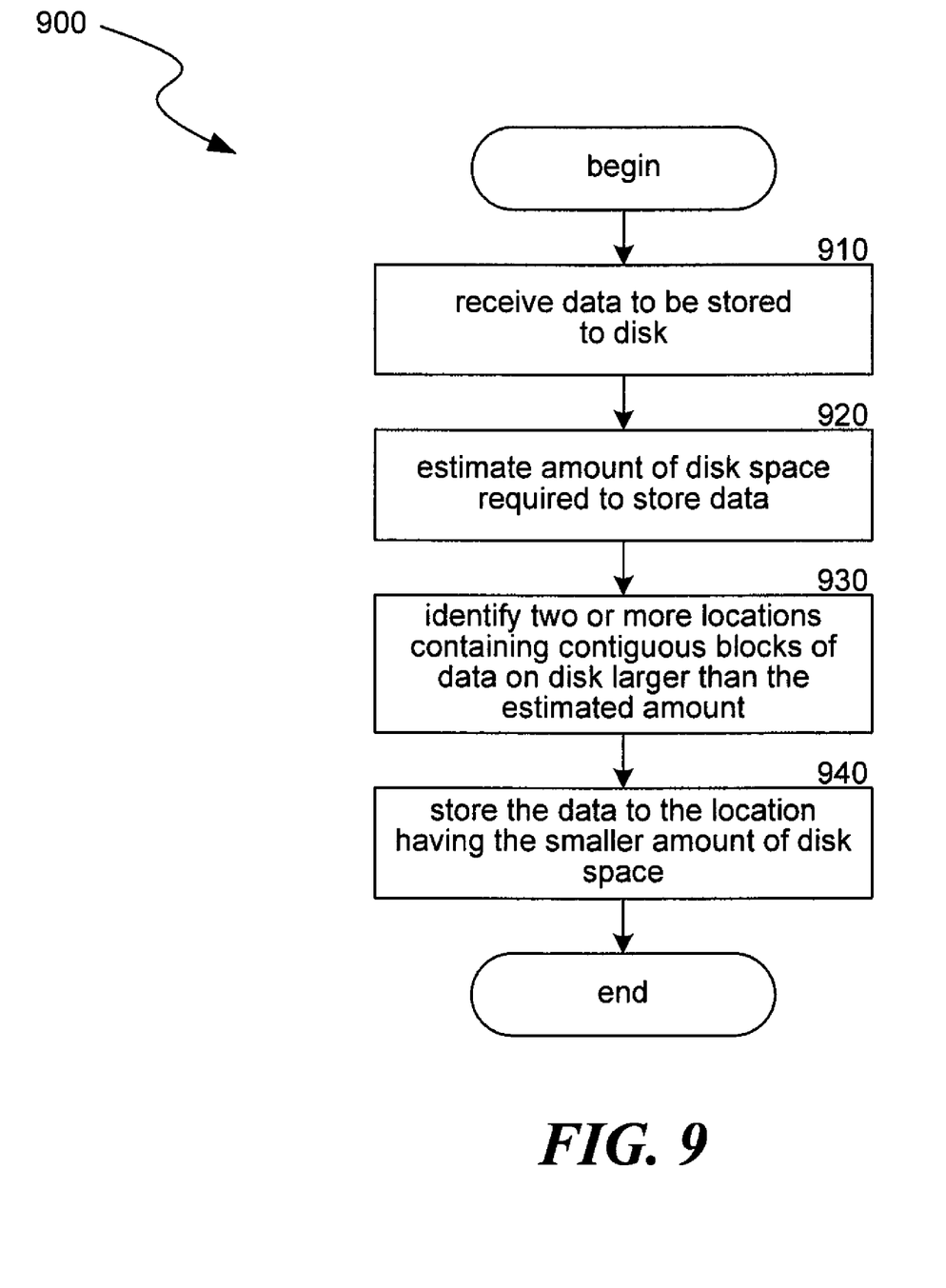
FIG. 9 is a flow diagram illustrating a routine for optimizing the storage of data onto a disk.

Referring to FIG. 9, a flow diagram illustrating a routine 900 for optimizing the storage of data onto a disk is shown. In block 910, the system receives data to be stored to disk. In block 920, the system estimates an amount of disk space required to store the data, as discussed herein. In block 930, the system identifies two or more locations containing contiguous blocks of data on disk having a capacity larger than the estimate amount of capacity required to store the data. In some cases, the two or more locations are on a single disk. In some cases, the two or more locations may be contained by multiple disks. For example, the system may identify four disks each having one single location of sufficient capacity. In block 940, the system stores the data to the location having the smaller or smallest amount of disk space.

In some cases, a data storage system may not be able to identify a location on a disk that contains a sufficient number of contiguous data blocks to store a set of data. For example, the system may identify many locations that have available space, but none of the locations are large enough to store the entire set of data. The system may remedy such a situation by grouping the set of data into subsets to fit the available locations, as discussed above.

Alternatively, the system may pretend or seem to regroup or reconfigure the disk in order to create a location having sufficient capacity in which to store the set of data. The system may identify two non-contiguous locations that together having sufficient capacity in which to store a set of data, and pre-allocate the two non-contiguous locations as "one available location" in which to store the data.

Additionally, the system may attempt to pre-allocate or optimize disk space for future storage operations (that is, storage operations not yet scheduled). For example, the system may identify a future storage operation, calculate an estimated space needed for the storage operation, perform a defragmentation on available disks, and when there is no location large enough for the storage operation, pre-allocate a number of different locations that together are large enough for the storage operation. The system may then create a data structure that maps and/or tracks the pre-allocated disk space, reserving the disk space for the future storage operation.

CONCLUSION

The above system may be performed with systems and methods that also dynamically improve modify, and/or correct data flows in data storage operations. For example, the system may dynamically select a path to transfer data from a client server to a secondary storage device using information received during a data storage operation or using information associated with, related to, or otherwise from the data storage operation. During storage operations using multiple data transfer paths (or, data streams), the system may selectively choose a stream based on a number of characteristics, such as the load on a stream, the type of secondary storage device, the load on the secondary storage device, the nature of the data, the availability of components, information related to prior storage operations, and so on.

Additionally, the system may dynamically modify storage operations based on a storage window for the storage operations. For example, the system may monitor the progress of the data being stored (such as the amount of data stored and to be stored) versus the time remaining in the storage window for the storage operation. The system may then choose to modify storage operations when needed, such as delaying some storage operations, utilizing additional or alternative resources, and so on.

The system may perform some or all of the above examples in combination with the other systems. For example, the system may use aspects of dynamic stream management to choose a stream to transfer a data store job, and may transfer that job within pre-allocated disk space for multiple jobs. The system may trigger dynamic stream management processes based on a review of the storage window.

The system may perform pre-allocation when the storage window is short and an otherwise defragmentation of disks may cause the data storage operations to exceed the storage window. The system may perform other combinations to modify and improve data storage operations as needed.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the technology are presented below in certain claim forms, the inventors contemplate the various aspects of the technology in any number of claim forms. For example, while only one aspect of the technology is recited as a computer-readable medium claim, other aspects may likewise be embodied as a computer-readable medium claim. Accordingly, the inventors reserve the right to add additional claims after filing the application to pursue such additional claim forms for other aspects of the technology.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A computer-readable medium whose contents cause a data storage system to perform a method of storing data to a disk-based data storage medium, the method comprising:
   receiving data to be stored to a disk-based data storage medium;
   estimating an amount of space required to store the received data;
   identifying a location on the disk-based data storage medium having available space;
   determining if the identified location contains an amount of available space equal to or larger than the estimated amount of space required to store the received data; and
   when the identified location does contain an amount of available space equal to or larger than the estimated amount of space required to store the received data, transferring the received data to the identified location; and
   when the identified location does not contain an amount of available space equal to or larger than the estimated amount of space required to store the received data,
      examining characteristics of the received data;
      selecting a subset of the received data based on the examined characteristics; and
      transferring the selected subset of the received data to the identified location.

2. The computer-readable medium of claim 1, wherein selecting a subset of the received data based on the examined characteristics includes selecting data encrypted with a same security key.

3. The computer-readable medium of claim 1, further comprising identifying available contiguous space on the disk-based storage medium.

4. The computer-readable medium of claim 1 wherein the examining includes examining a type of data, or a date the data was created or modified.

5. The computer-readable medium of claim 1 wherein the examining includes examining metadata assigned to the data, wherein the examined metadata includes information related to an owner or creator of the data, a frequency of access of the data, content of the data, security or permissions assigned to the data, or tags applied to the data by users.

6. The computer-readable medium of claim 1 wherein the examining includes examining a set of data and determining that a portion of the data has not been assigned any tags by users, and wherein the selecting includes grouping the untagged data as the selected subset.

7. The computer-readable medium of claim 1 wherein the selecting of the subset includes grouping similarly tagged data, grouping data having similar metadata characteristics, grouping data created by the same users, grouping data created during a similar time period, of grouping data that is not associated other data.

8. The computer-readable medium of claim 1 wherein the transferring includes transferring the subset of data to a location on the disk-based medium having a size similar to a size of the subset of data.

9. A method of storing data to a disk-based data storage medium, the method comprising:
   receiving data to be stored to a disk-based data storage medium;
   estimating an amount of space required to store the received data;
   identifying a location on the disk-based data storage medium having available space;
   determining if the identified location contains an amount of available space equal to or larger than the estimated amount of space required to store the received data; and
   when the identified location does contain an amount of available space equal to or larger than the estimated amount of space required to store the received data, transferring the received data to the identified location; and
   when the identified location does not contain an amount of available space equal to or larger than the estimated amount of space required to store the received data,
      examining characteristics of the received data;
      selecting a subset of the received data based on the examined characteristics; and
      transferring the selected subset of the received data to the identified location.

10. The method of claim 9, wherein selecting a subset of the received data based on the examined characteristics includes selecting data encrypted with a same security key.

11. The method of claim 9, further comprising identifying available contiguous space on the disk-based storage medium.

12. The method of claim 9 wherein the examining includes examining a type of data, or a date the data was created or modified.

13. The method of claim 9 wherein the examining includes examining metadata assigned to the data, wherein the examined metadata includes information related to an owner or creator of the data, a frequency of access of the data, content of the data, security or permissions assigned to the data, or tags applied to the data by users.

14. The method of claim 9 wherein the examining includes examining a set of data and determining that a portion of the data has not been assigned any tags by users, and wherein the selecting includes grouping the untagged data as the selected subset.

15. The method of claim 9 wherein the selecting of the subset includes grouping similarly tagged data, grouping data having similar metadata characteristics, grouping data created by the same users, grouping data created during a similar time period, of grouping data that is not associated other data.

16. The method of claim 9 wherein the transferring includes transferring the subset of data to a location on the disk-based medium having a size similar to a size of the subset of data.

* * * * *

UNITED STATES PATENT AND TRADEMARK OFFICE
CERTIFICATE OF CORRECTION

PATENT NO.       : 7,831,766 B2                     Page 1 of 1
APPLICATION NO.  : 11/963555
DATED            : November 9, 2010
INVENTOR(S)      : Parag Gokhale et al.

It is certified that error appears in the above-identified patent and that said Letters Patent is hereby corrected as shown below:

On sheet 8 of 9, in figure 8, in Box 830, line 2, delete "sufficent" and insert -- sufficient --, therefor.

In column 1, line 33, delete "6 µM" and insert -- 6 AM --, therefor.

Signed and Sealed this
Twenty-fifth Day of January, 2011

David J. Kappos
*Director of the United States Patent and Trademark Office*

UNITED STATES PATENT AND TRADEMARK OFFICE
CERTIFICATE OF CORRECTION

PATENT NO. : 7,831,766 B2  Page 1 of 1
APPLICATION NO. : 11/963555
DATED : November 9, 2010
INVENTOR(S) : Parag Gokhale et al.

It is certified that error appears in the above-identified patent and that said Letters Patent is hereby corrected as shown below:

On the Title Page, Item (73), delete "Comm Vault" and insert -- CommVault --, therefor.

Signed and Sealed this
Twelfth Day of July, 2011

David J. Kappos
*Director of the United States Patent and Trademark Office*